United States Patent
Olia et al.

(10) Patent No.: US 10,072,532 B2
(45) Date of Patent: Sep. 11, 2018

(54) METHOD FOR STARTING-UP AND OPERATING A COMBINED-CYCLE POWER PLANT

(71) Applicant: ALSTOM Technology Ltd, Baden (CH)

(72) Inventors: Hamid Olia, Zürich (CH); Jan Schlesier, Wettingen (CH); Michael Breitfeld, Adliswil (CH); Philipp Brunner, Baden (CH); Mark Stevens, Ehrendingen (CH); Michael Caflisch, Fislisbach (CH)

(73) Assignee: General Electric Technology GmbH, Baden (CH)

( * ) Notice: Subject to any disclaimer, the term of this patent is extended or adjusted under 35 U.S.C. 154(b) by 426 days.

(21) Appl. No.: 14/199,312

(22) Filed: Mar. 6, 2014

(65) Prior Publication Data

US 2014/0250901 A1 Sep. 11, 2014

(30) Foreign Application Priority Data

Mar. 6, 2013 (EP) .................................... 13158063

(51) Int. Cl.
| | |
|---|---|
| *F01K 23/00* | (2006.01) |
| *F01K 23/10* | (2006.01) |
| *F01K 13/02* | (2006.01) |
| *F01K 13/00* | (2006.01) |

(52) U.S. Cl.
CPC .............. *F01K 23/10* (2013.01); *F01K 13/02* (2013.01); *Y02E 20/16* (2013.01)

(58) Field of Classification Search
CPC ........ F01K 23/106; F01K 23/10; F01K 13/02; F01K 13/00; Y02E 20/16; Y02E 20/00; H02J 13/0086
See application file for complete search history.

(56) References Cited

U.S. PATENT DOCUMENTS

| 560,903 A | 5/1896 | Jordan |
|---|---|---|
| 4,028,884 A | 6/1977 | Martz et al. |
| (Continued) | | |

FOREIGN PATENT DOCUMENTS

| CN | 202230373 | 5/2012 |
|---|---|---|
| DE | 4417538 A1 | 11/1995 |
| (Continued) | | |

*Primary Examiner* — David Bryant
*Assistant Examiner* — Lawrence Averick
(74) *Attorney, Agent, or Firm* — GE Global Patent Operation; Marc A. Vivenzio

(57) ABSTRACT

A method for starting-up a steam turbine of a combined-cycle power plant is provided. The combined-cycle power plant includes a gas turbine and a steam power generation system having a steam turbine. The combined-cycle power plant activates at least one electric generator connectable to an electric grid. The gas turbine includes a compressor, such that, during starting-up of the steam turbine, both the gas turbine and the steam turbine are in operation. The steam turbine adjusts its load as a function of the load of the gas turbine in such a way that the sum of the load provided by the gas turbine and of the load provided by the steam turbine is equal to the auxiliary power demand of the plant. The load exported to the grid is equal to zero.

6 Claims, 3 Drawing Sheets

(56) References Cited

U.S. PATENT DOCUMENTS

| | | | |
|---|---|---|---|
| 4,455,614 A * | 6/1984 | Martz | F01K 23/10 290/40 R |
| 4,550,379 A * | 10/1985 | Kawai | F01K 13/02 700/287 |
| 5,518,311 A | 5/1996 | Althaus et al. | |
| 5,593,302 A | 1/1997 | Althaus et al. | |
| 2001/0023576 A1* | 9/2001 | Rollins, III | F01K 23/105 60/772 |
| 2005/0268594 A1 | 12/2005 | Kurihara et al. | |
| 2006/0232071 A1 | 10/2006 | Althaus | |
| 2007/0240400 A1* | 10/2007 | Smith | F01K 23/101 60/39.182 |
| 2009/0126338 A1* | 5/2009 | Kitaguchi | F01K 13/02 60/39.182 |
| 2009/0211259 A1* | 8/2009 | Gobrecht | F01K 23/10 60/772 |
| 2010/0281877 A1 | 11/2010 | Asanaka et al. | |
| 2012/0167546 A1 | 7/2012 | Oomens et al. | |
| 2013/0082467 A1* | 4/2013 | Olia | F01K 23/106 290/4 C |
| 2015/0275703 A1* | 10/2015 | Thompson | F01K 23/101 60/773 |

FOREIGN PATENT DOCUMENTS

| | | |
|---|---|---|
| EP | 0 605 156 | 7/1994 |
| EP | 0718558 A2 | 6/1996 |
| EP | 2 056 421 | 5/2009 |
| EP | 2 423 462 | 2/2012 |
| JP | S58-197408 | 11/1983 |
| JP | S59-68503 | 4/1984 |
| JP | S60-249609 | 12/1985 |
| JP | 2004-076658 | 3/2004 |
| JP | 2004-080945 | 3/2004 |
| JP | 2004-514817 | 5/2004 |
| JP | 2006-191748 | 7/2006 |
| RU | 2182247 C2 | 5/2002 |
| RU | 2186224 C2 | 7/2002 |
| RU | 2374472 C1 | 11/2009 |
| WO | 2012/131575 | 10/2012 |

* cited by examiner

METHOD FOR STARTING-UP AND OPERATING A COMBINED-CYCLE POWER PLANT

CROSS-REFERENCE TO RELATED APPLICATIONS

This application claims priority to European application 13158063.1 filed Mar. 6, 2013, the entire contents of which are hereby incorporated in its entirety.

TECHNICAL FIELD

The present invention relates to a method for starting-up a combined-cycle power plant operating at house load without any power being exported to the grid.

BACKGROUND

At present times, the production from renewable energy sources being steadily growing, "conventional" power plants will increasingly be required to take on additional tasks such as to provide complementary electricity production to the grid they are connected to on short notice, particularly in the absence of large-scale energy storage systems, which are still far away from commercialization. Large fluctuations during the day require power generators to react quickly to maintain the balance between demand and production. Under these circumstances, the power plants have to supply power to the grid in a flexible way: for example, when the energy required by the grid is low they must be able to reduce the power supplied to the grid down to zero and when the grid requires power again they must be able to provide it very quickly (in some cases they must be able to provide tens of megawatts in seconds).

In the last ten years, the key area of focus of conventional power sources has been the switch from base load to intermediate load operation, and thus the need for fast load ramps, shorter low-load and start-up times, and grid stabilization. In addition, the demand for ancillary services such as provision of control reserves and frequency support, as well as tertiary control reserves and load-follow operation, has increased significantly. As a result, new operating requirements have emerged, such as two-shift operation, load-follow operation, island operation, black start capability, frequency support and very high start-up and operating reliability, in order to stabilize power grid dynamics and hence ensure secure and economic electricity supply.

As the requirements for load cycling are changing and the expansion of renewables is increasing, "conventional" power plants will have to accommodate to periods in which there is an over- or under-capacity of power. Depending on the country and power grid concerned, various dynamic capabilities are required. Combined-cycle plants (i.e. power plants comprising gas and steam turbines) allow faster load changes within a wider load range, which make these plants more flexible. Furthermore, when considering fast start-ups and efficiency, the combined cycle power plant stands high in comparison with other electricity production methods. Even more, combined-cycle plants offer a significantly higher rate of load change than other conventional power plants thanks to innovative and specifically developed systems.

If, in future, the renewable capacity that is currently planned becomes operational, previously base loaded power plants, such as combined-cycle power plants, will not merely have to be run down to part load, but will have to be completely shut down in many cases in order to avoid significant overcapacities. These combined-cycle power plants will then need to be started up from the shut-down condition as rapidly as possible to cover demand in the event of short term loss of renewable power. The only solution, in the absence of adequate storage systems, is the increased use of conventional plants in so-called "two-shift operation", that is, start-up and shut-down on a daily basis (and sometimes several times per day) in order to compensate for fluctuations in load. Under these operating conditions, it is essential that start-ups are able to take place very rapidly and reliably, which is possible with combined cycle plants, due to the relative simplicity of their fuel and combustion systems.

As it was mentioned, start-up reliability is becoming an increasingly important issue and combined-cycle plants exhibit significant advantages over other conventional technologies in this respect, due to the fact that they have the lowest degree of complexity. Several start-up methods for combined-cycle power plants are known in the state of the art, as per EP 2423462 A2, EP 0605156 A2, CN 202230373 U, for example. Enhanced start-ups are known as per US 2005/0268594 A1, US 2009/0126338 A1 or WO 2012/131575 A1, for instance.

It is also known in the state of the art, for example as per EP 2 056 421, a method to connect a combined power plant, comprising a gas turbine and a steam turbine, to a grid.

In combined-cycle power plants, having two power generating units, gas turbine and steam turbine, during start-up, gas turbine starts as the first unit to run up by increasing the shaft speed to nominal speed. After synchronization with the electrical network, gas turbine starts to supply power to the grid. Steam turbine is the second unit which can start when the steam conditions (such as steam pressure and steam temperature provided by the steam generator system) have reached the appropriate conditions for steam turbine components (such as the shaft, the casing and the steam admission valves). The colder the steam turbine materials are, the lower the steam conditions should be (lower steam pressure and lower steam temperature, for instance) in order to prevent extreme impact on steam turbine component lifetime. This may be achieved by the operation of the gas turbine at lowest possible load corresponding to the lowest possible gas turbine exhaust temperature and exhaust mass flow. In order to achieve steam turbine start-up requirements, the steam generating system such as heat recovery steam generators must be equipped with de-superheating stations which are capable to control the required steam temperature. In addition, the steam turbine by-pass stations must be also designed corresponding to steam turbine pressure requirement for the start-up.

Traditional start-up procedures require start of the steam turbine at low to intermediate gas turbine operation loads which leads to an overdesign of de-superheating stations and steam turbine bypass station. Furthermore, due to unpredictability of start-up load profile, the exported power during start-up is not paid by the grid authorities. The grid operator has to integrate gas and steam turbine exported power into the electrical network and manipulate the total grid power accordingly. Also the start-up fuel consumption costs must be covered by the plant owner. Therefore, the plant owner prefers to start the steam turbine at the lowest possible gas turbine load to decrease start-up costs.

Therefore, it would be desirable that the steam turbine start-up (running up and heating up) to the condition ready for loading occurs at the lowest possible power, without exporting any power to the grid.

The present invention is oriented towards these needs.

SUMMARY

The present invention relates to a method for starting-up a combined-cycle power plant, connectable to a grid, operating at house load, so no power is exported to the grid. More specifically, the invention refers to a method for starting-up the steam turbine of a combined-cycle power plant to a condition ready for loading, occurring at the lowest possible power, without exporting any power to the grid.

In the method of operation of the invention all turbines (both gas and steam turbines) of the power plant are connected (are online) and the active power that is produced (that is, the total of the power output generated by all the turbines in the power plant) does not exceed the house load consumption (that is, does not exceed the power supply needed for internal consumption of the power plant). Thus, the active power exported to the grid is zero.

The method of the invention can operate with the power plant being connected to the grid and also with the power plant being disconnected from the grid.

The combined-cycle start-up and operation of the invention offers potential with respect to unit commitment problem. Unit commitment is considered an increasingly important aspect in the context of cost efficient utilization of the available generating capacity. This optimal utilization is subject to the start-up/shut down costs and ramping constraints of the combined-cycle power plant. In addition, reserve requirements (spinning and non-spinning) are to be taken into consideration. The following advantages are provided by the invention:
- the export of active power to the grid becomes very deterministic since interruptions introduced by the steam turbine start-up and loading process are eliminated: thus, the uncertainty can be reduced since the steam turbine is synchronized before active power is exported;
- the steam turbine start-up occurs at the lowest fuel consumption that is possible for operation (equal or below gas turbine zero load);
- the de-superheating station capacity is reduced which means costs reduction;
- the steam turbine bypass station capacity is reduced which means costs reduction;
- any start-up failure of the steam turbine has no impact on grid stability (grid connection breaker is open, as there is no power exported to the grid);
- the spinning reserve capacity is increased: capacity can be provided from house load to combined-cycle base load without interruption of the loading process (for example, for steam turbine start).

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
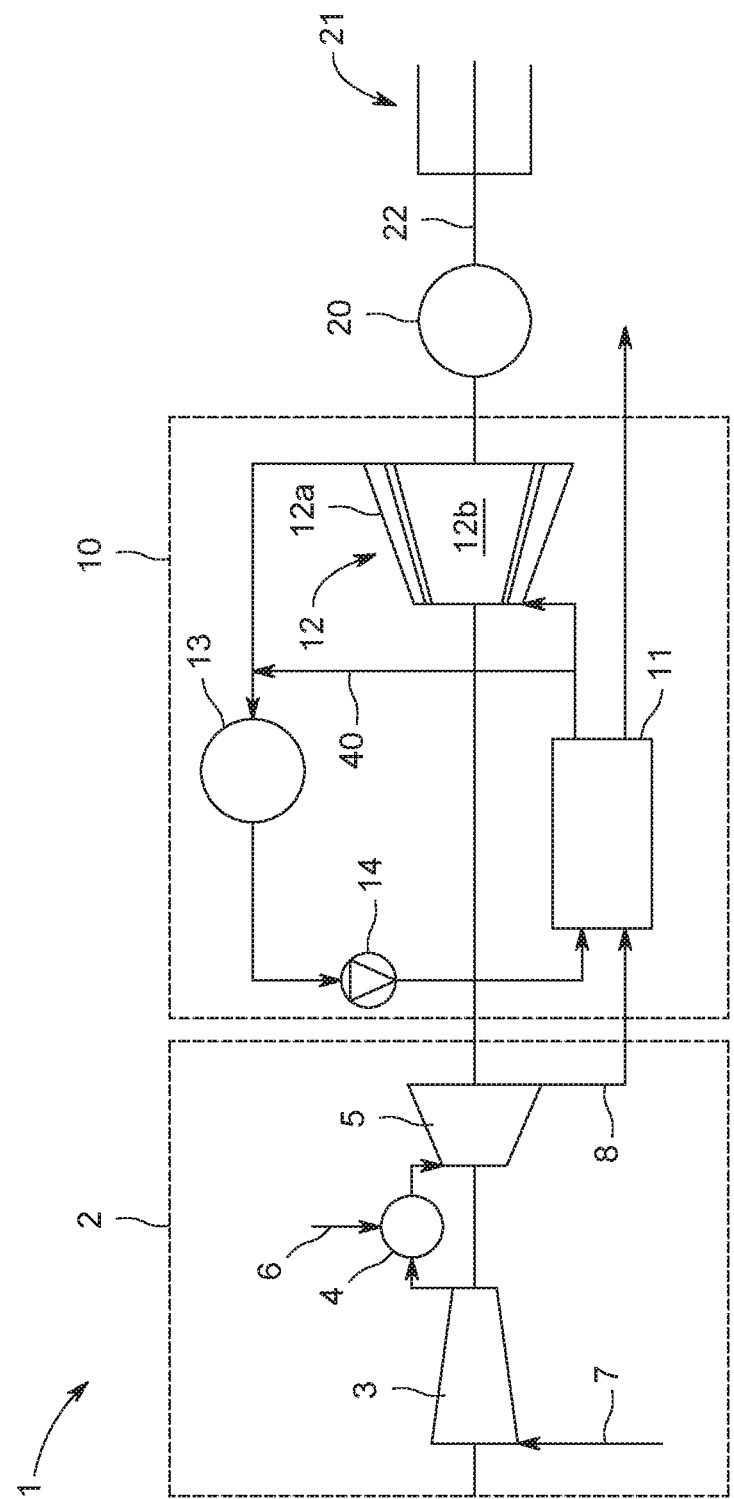
FIG. 1 shows a schematic view of a combined-cycle power plant that can be used to implement the method according to the invention.
Figure 2:
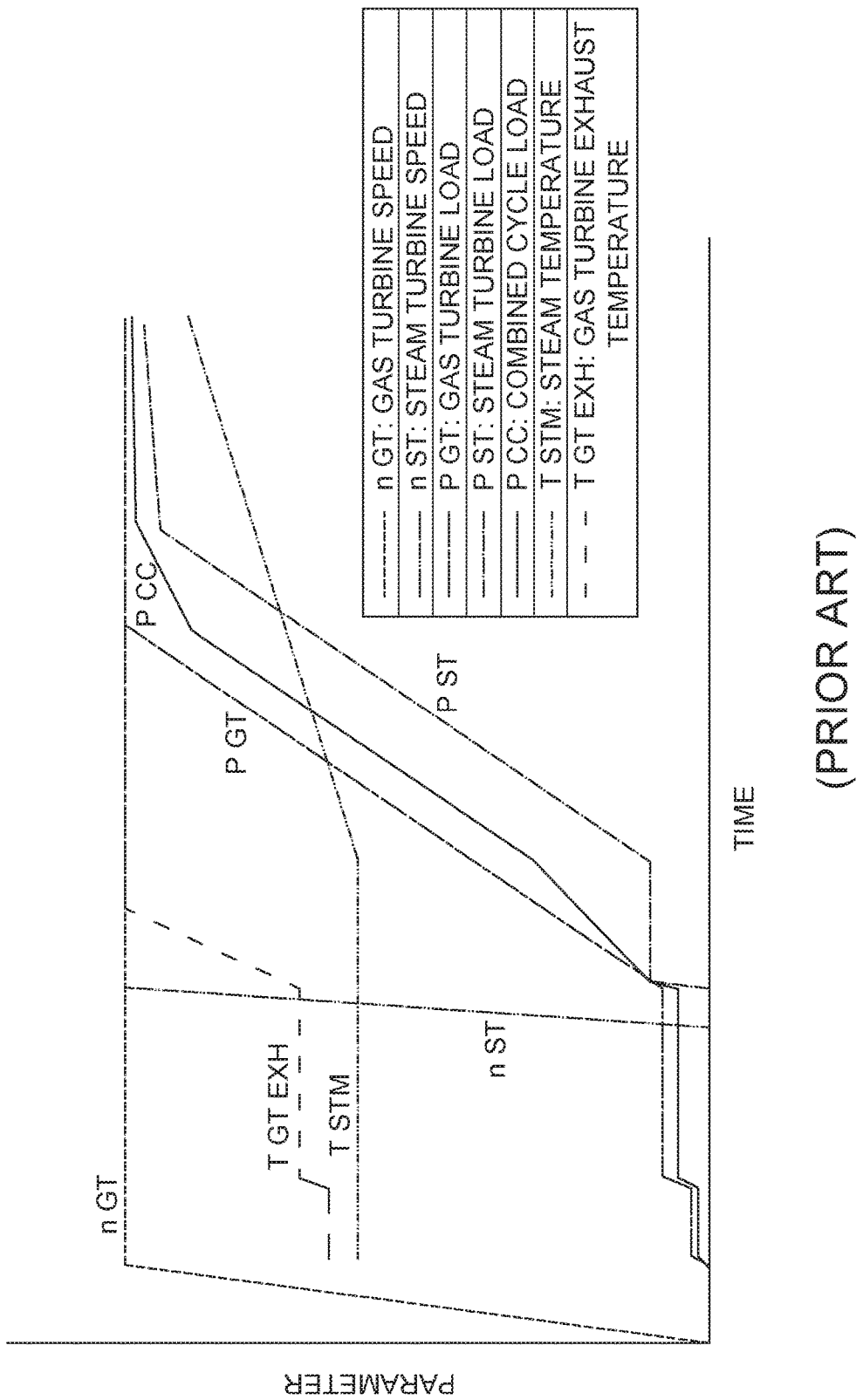
FIG. 2 shows the start-up and operation of a combined-cycle power plant, similar to that shown in FIG. 1, illustrating the start of the gas turbine and the steam turbine, according to the known prior art.
Figure 3:
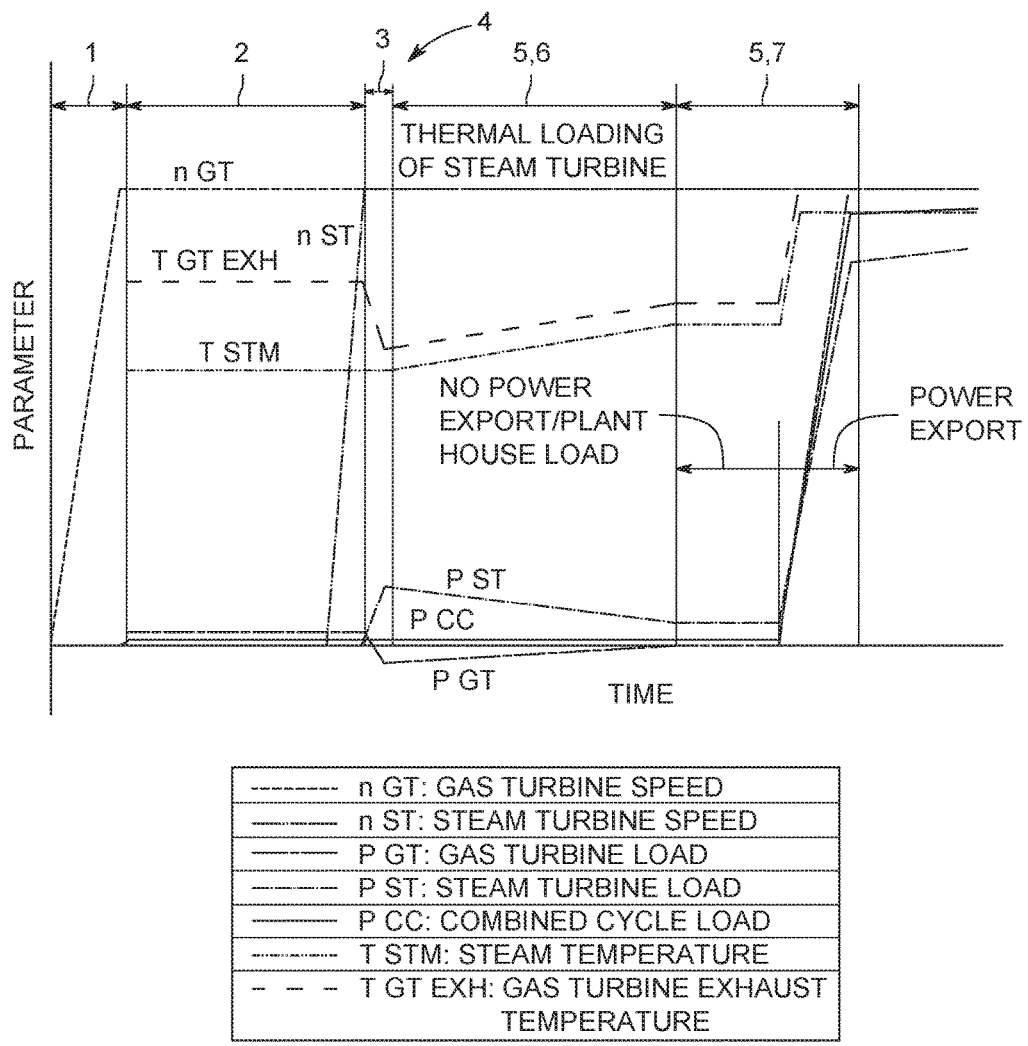
FIG. 3 shows the start-up and operation of a combined-cycle power plant, similar to that shown in FIG. 1, illustrating the start of the gas turbine and the steam turbine, according to the present invention.

The present invention discloses a method for starting-up a combined-cycle power plant as the one schematically shown in FIG. 1. According to the method of the invention, the steam turbine start-up to the condition ready for loading occurs at the lowest possible power, without exporting any power to the grid, as it will be further explained.

The power plant 1 comprises a gas turbine 2 and a steam power generation system 10: the gas turbine 2 and the steam power generation system 10 activate an electric generator 20 connected to an electric grid 21 via line 22.

The gas turbine 2 comprises a compressor 3, a combustion chamber 4 and a turbine 5. The combustion chamber 4 is fed with fuel 6 and oxidizer 7 (usually air compressed in the compressor 3); fuel 6 and oxidizer 7 are combusted to generate hot gases that are expanded in the turbine 5 to obtain mechanical power.

The turbine 5 discharges exhaust flue gases 8 that are then supplied to the steam power generation system 10; the steam power generation system 10 comprises a boiler 11 (also called Heat Recovery Steam Generator HRSG) that receives the flue gases 8 from the gas turbine 2 and produces steam that is expanded in a steam turbine 12, comprising a stator 12a and a rotor 12b. Typically, as shown in FIG. 1, the steam power generation system 10 also comprises a condenser 13 and a pump 14.

Different schemes to the exemplary one shown in FIG. 1 are also possible for implementing the method of the invention.

Preferably, during this operation at steady state the electric generator 20 is connected to the grid 21: a breaker (not shown) connects the generator 20 with the grid 21 such that, when the breaker is closed, the generator 20 is connected to the grid 21 but does not provide any power to it. Alternatively the electric generator 20 can also be not connected to the grid 21 (i.e. the breaker is open).

According to the invention, the turbine 5 and the steam turbine 12 are online (are connected) and the power supplied by the gas turbine 2 plus that supplied by the steam turbine 12 to the grid 21 is substantially equal to zero, that is, the power plant 1 is operating at the house load. The house load corresponds to that power that must be provided to or produced by the power plant 1 to supply the auxiliaries and for its internal use. Thus, when operating at the house load, the power plant 1 produces power for its internal use but it is not able to substantially supply any power to the grid 21, so the power supplied to the grid 21 is substantially equal to zero.

With the invention, the start of the steam turbine 12 occurs at the lowest possible plant exported power. The plant zero load operation point is a specific operating point of combined-cycle power plants, allowing the operation of all the components of the plant 1, including the steam turbine 12, supplying power to the plant auxiliaries, and providing no power to the electrical network, that is, providing no power to the grid 21. The start of the steam turbine 12 and the coordination of the gas turbine 2 with the start-up requirements of the steam turbine 12 are characterized as follows, according to the invention:

1—The gas turbine 2 is started to house load operating point, that is, the gas turbine 2 supplies as much power as that required for the plant auxiliaries; at this operation point, the power plant 1 needs no electricity from the electrical grid 21, and the grid connection breaker is typically opened.
2—The gas turbine 2 operates at house load until the steam condition for the speed up of the steam turbine 12 is fulfilled and the steam turbine 12 has reached the nominal operating speed.
3—The steam, turbine 12 starts to load up and, at the same time, the gas turbine 2 decreases the load to match the total generation power to the power required by the plant auxiliaries. The reduction of the gas turbine 2 power depends on the initial temperature of the material in the steam turbine 12 (the initial temperature of the material in the steam turbine 12 is the material temperature at the point of time when the steam turbine 12 run-up is initiated and the first steam admission into the steam turbine 12 takes place), such as, for example, the initial temperature of the shaft of the steam turbine 12. The lower the temperature of the steam turbine 12, the lower the load of the gas turbine 2 will be. The lowest possible gas turbine 2 load depends on the gas turbine 2 combustion stability and on the required gas turbine 2 exhaust temperature. The reduction of the gas turbine 2 power can be below the gas turbine 2 zero operation load. At gas turbine zero operation load, the gas turbine 2 can generate sufficient power to operate its compressor 3 at nominal speed. The highest possible gas turbine 2 load corresponds to the load required for the plant auxiliaries (gas turbine house load). The lowest steam turbine load is the steam turbine zero load which corresponds to the steam turbine load which is sufficient to operate the steam turbine 12 at nominal speed. The highest steam turbine load corresponds to the power required to provide power to the plant auxiliaries and maintain the gas turbine compressor 3 at nominal speed. The initial temperature of the material of the steam turbine 12 defines the required temperatures and the required temperature gradients of the steam entering the steam turbine 12. To achieve a certain steam temperature, the gas turbine 2 has to provide a certain minimum exhaust temperature: typically, the gas turbine 2 exhaust temperature is correlated to the gas turbine 2 load, such that an increasing gas turbine 2 load will cause an increasing gas turbine 2 exhaust temperature. As a final consequence, the gas turbine 2 will be loaded depending on the initial temperature of the material of the steam turbine 12. The gas turbine 2 will be loaded as much as required to provide a certain minimum exhaust temperature. The gas turbine 2 load will not be loaded more than required to provide a certain minimum exhaust temperature in order to keep fuel consumption as low as possible. The steam turbine 12 will be adjusting its load as a function of the load of the gas turbine 2 in such a way that the sum of the load provided by the gas turbine 2 and of the load provided by the steam turbine 12 is equal to the auxiliary power demand of the plant 1, the load exported to the grid 21 being equal to zero. The steam turbine 12 thermal loading can be started by increasing the gas turbine 2 load gradually. The increase of the gas turbine 2 load leads to an increase in the gas turbine 2 exhaust temperature, consequently leading to a gradual increase of the steam temperature entering the steam turbine 12. At the same time, the steam turbine 12 decreases the load to comply with the zero load requirement of the power plant 1.
4—The gas turbine 2 stops de-loading as soon as the minimum required exhaust temperature has been achieved. The steam turbine 12 stops to load up: this condition corresponds to the zero load operation mode of the plant 1. The sum of the load of the gas turbine 2 and the load of the steam turbine 12 is equal to the plant auxiliary power demand and the exported load to the electrical grid 21 is equal to zero.
5—The gas turbine 2 stays at this mode and the steam entering the steam turbine 12 heats up the material of the steam turbine 12. in case the initial temperature of the material in the steam turbine 12 is sufficiently high, the steam turbine 12 can be loaded by increasing the load of the gas turbine 2. In case the temperature of the material in the steam turbine 12 is not sufficiently high, the thermal loading of the steam turbine 12 is started. Generally, the steam turbine 12 is subjected to two types of start-up stresses, mechanical stress and thermal stress. At plant zero load operation mode, the mechanical load on the steam turbine 12 can be kept very low. The steam production by the boiler 11 is small due to the low load of the gas turbine 2, allowing the steam turbine 12 bypass stations 40 to provide a low steam pressure as required by the steam turbine 12.
6—The thermal loading of the steam turbine 12 can be started gradually increasing the load of the gas turbine 2, leading to an increase in the exhaust temperature of the gas turbine 2, which consequently leads to a gradual increase of the steam temperature entering the steam turbine 12. At the same time, the steam turbine 12 decreases the load to comply with zero plant load requirement.
7—The loading of the gas turbine 2 can be interrupted as soon as the materials of the steam turbine 12 have reached the required condition for the mechanical loading of the steam turbine 12. At this plant operation condition, the sum of the load of the steam turbine 12 and the load of the gas turbine 2 corresponds to the required plant auxiliaries load and the exported power to the electrical network or grid 21 is equal to zero. The power plant 1 can stay at this operation mode as long as it is desired by the plant operator, or it can increase the load with different gradients (fast or slow) after closing the grid connection breaker.

The method of the invention improves the cost efficiency utilization of the available power capacity generated by the power plant 1. This optimal utilization is subject to start-up and shut down costs and ramping constraints (time) of the power plant 1. The main advantages regarding cost efficiency utilization of the method of the invention are the following:

a) in the known prior art methods, the loading process of the combined-cycle power plant 1 is interrupted in order to start and/or to load the steam turbine 12, in order to reduce thermal stress of critical components in the steam turbine 12. Therefore, the loading profile of the power plant 1 depends on the conditions of the plant before the start (thermal state, ambient conditions, etc.) and is thereby subject to considerable uncertainty. This uncertainty is eliminated with the method of the invention, since the steam turbine 12 is synchronized to the speed of the gas turbine 2 speed before active power is exported to the grid 21;

b) the method of the invention operates with the lowest fuel consumption that is possible for operation (below the gas turbine 2 zero load, as explained above);

c) the method of the invention increases the spinning reserve capacity, as capacity can be provided from house load to combined-cycle base load without interruption of the loading process (for example, for the start of the steam turbine 12).

Although the present invention has been fully described in connection with preferred embodiments, it is evident that modifications may be introduced within the scope thereof, not considering this as limited by these embodiments, but by the contents of the following claims.

The invention claimed is:

1. A method for starting-up a combined-cycle power plant, the combined-cycle power plant comprising a gas turbine supplying exhaust flue gasses to a steam power generation system comprising a steam turbine, and further comprising at least one electric generator connectable to an electric grid, the method comprising:

operating the gas turbine to a house load operating point where a load exported to the electrical grid is equal to zero;

when a temperature of the exhaust flue gases provides a first steam admission into the steam turbine, increasing a load of the steam turbine and decreasing a load of the gas turbine until a minimum gas turbine exhaust flue gas temperature for providing the first steam admission into the steam turbine is reached, while maintaining the total generation power at the house load operating point where a load exported to the electrical grid is equal to zero; and activating at least one electric generator connectable to an electric grid of the combined cycle power plant, wherein at least (i) the minimum load value that the steam turbine can provide corresponds to the load that is sufficient to operate the steam turbine at nominal speed, (ii) the gas turbine operates at the house load until the steam turbine has reached the nominal speed, (iii) the maximum load value that the steam turbine can provide corresponds to that required for the auxiliary power demand of the plant, maintaining the compressor at its nominal speed, and (iv) active power is exported to the grid only after synchronizing the speed of the steam turbine to the speed of the gas turbine.

2. The method according to claim 1, wherein the gas turbine adjusts its load by reducing it, such that the minimum load value provided by the gas turbine corresponds to the load with which the compressor operates at nominal speed.

3. The method according to claim 1, wherein the gas turbine adjusts its load by increasing it, such that the maximum load value provided by the gas turbine corresponds to the load value required for the auxiliary power demand of the plant.

4. The method according to claim 1, wherein the electric generator is disconnected to the grid.

5. The method according to claim 1, wherein the electric generator is connected to the grid.

6. The method according to claim 1, wherein the steam pressure in the steam power generation system is restricted by means of steam bypass stations.

\* \* \* \* \*